(12) United States Patent
Preijert et al.

(10) Patent No.: US 10,279,640 B2
(45) Date of Patent: May 7, 2019

(54) WHEEL SUSPENSION WITH CENTRALLY PIVOTED TRANSVERSE LEAF SPRING

(71) Applicant: VOLVO TRUCK CORPORATION, Göteborg (SE)

(72) Inventors: Stefan Preijert, Göteborg (SE); Hoda Yarmohamadi, Torslanda (SE)

(73) Assignee: Volvo Truck Corporation, Göteborg (SE)

( * ) Notice: Subject to any disclaimer, the term of this patent is extended or adjusted under 35 U.S.C. 154(b) by 81 days.

(21) Appl. No.: 15/526,404

(22) PCT Filed: Nov. 14, 2014

(86) PCT No.: PCT/SE2014/000133
§ 371 (c)(1),
(2) Date: May 12, 2017

(87) PCT Pub. No.: WO2016/076765
PCT Pub. Date: May 19, 2016

(65) Prior Publication Data
US 2017/0305222 A1    Oct. 26, 2017

(51) Int. Cl.
*B60G 3/28* (2006.01)
*B60G 11/08* (2006.01)
(Continued)

(52) U.S. Cl.
CPC ............ *B60G 5/047* (2013.01); *B60G 3/28* (2013.01); *B60G 11/08* (2013.01); *B60G 11/10* (2013.01);
(Continued)

(58) Field of Classification Search
CPC .......... B60G 5/047; B60G 3/28; B60G 11/08; B60G 11/10; B60G 11/34; B60G 13/005;
(Continued)

(56) References Cited

U.S. PATENT DOCUMENTS 1,609,946 A    12/1926  Hill
2,113,094 A *  4/1938  Paton ................. B60G 3/20
                                                267/254
(Continued)

FOREIGN PATENT DOCUMENTS

DE    102010022895 A1    12/2011
EP        0827851 A1     3/1998
(Continued)

OTHER PUBLICATIONS

International Search Report (dated Aug. 10, 2015) for corresponding International App. PCT/SE2014/000133.
(Continued)

*Primary Examiner* — Drew J Brown
(74) *Attorney, Agent, or Firm* — WRB-IP LLP

(57) ABSTRACT

A wheel suspension arrangement is provided for a vehicle having a longitudinal direction, a transverse direction and a vertical direction. The wheel suspension arrangement includes a wheel holder for supporting a vehicle wheel. A first vertical end region of the wheel holder is pivotally attached to a vehicle support structure by a rigid control arm and a second vertical end region of the wheel holder is attached to the vehicle support structure by a leaf spring. A longitudinal direction of the leaf spring is arranged substantially in the transverse direction of the vehicle. The leaf spring is pivotally attached to the vehicle support structure at a transverse center region of the vehicle, and a center of the leaf spring in the transverse direction is located vertically offset from a pivotal attachment location of the leaf spring. The pivotal attachment location of the leaf spring is vertically offset towards the side of the rigid control arm.

21 Claims, 11 Drawing Sheets

(51) Int. Cl.
*B60G 11/10* (2006.01)
*B60G 11/34* (2006.01)
*B60G 13/00* (2006.01)
*B60G 5/047* (2006.01)

(52) U.S. Cl.
CPC ............ B60G 11/34 (2013.01); B60G 13/005 (2013.01); *B60G 2200/144* (2013.01); *B60G 2200/46* (2013.01); *B60G 2202/114* (2013.01); *B60G 2202/22* (2013.01); *B60G 2204/121* (2013.01); *B60G 2204/13* (2013.01); *B60G 2204/143* (2013.01); *B60G 2204/82* (2013.01); *B60G 2204/8302* (2013.01); *B60G 2204/8306* (2013.01); *B60G 2206/428* (2013.01); *B60G 2300/02* (2013.01); *B60G 2300/026* (2013.01); *B60G 2300/14* (2013.01)

(58) Field of Classification Search
CPC .......... B60G 2200/144; B60G 2200/46; B60G 2202/114; B60G 2202/22; B60G 2204/121; B60G 2204/13; B60G 2204/143; B60G 2204/82; B60G 2204/8302; B60G 2204/8306; B60G 2206/428; B60G 2300/02; B60G 2300/026; B60G 2300/14
See application file for complete search history.

(56) References Cited

U.S. PATENT DOCUMENTS

| | | | | |
|---|---|---|---|---|
| 2,115,915 A | * | 5/1938 | McCain | B62D 17/00 280/124.14 |
| 2,149,895 A | | 3/1939 | Maruhn | |
| 2,697,613 A | * | 12/1954 | Giacosa | B01J 19/22 267/230 |
| 3,147,815 A | * | 9/1964 | Arkus-Duntov | B60G 3/24 180/360 |
| 4,779,894 A | * | 10/1988 | Cowburn | B60G 11/08 267/52 |
| 4,854,606 A | | 8/1989 | De Goncourt et al. | |
| 4,858,950 A | * | 8/1989 | Kajiwara | B60G 11/08 280/6.15 |
| 4,903,984 A | * | 2/1990 | Kajiwara | B60G 3/205 280/124.14 |
| 5,364,114 A | | 11/1994 | Petersen | |
| 6,189,904 B1 | * | 2/2001 | Gentry | B60G 11/08 267/149 |
| 6,390,486 B1 | * | 5/2002 | Boes | B60G 3/10 267/192 |
| 6,530,587 B2 | * | 3/2003 | Lawson | B60G 3/18 267/52 |
| 2001/0042967 A1 | * | 11/2001 | Stenvall | B60G 3/06 280/124.163 |
| 2013/0099462 A1 | * | 4/2013 | Ehrlich | B60G 21/051 280/124.116 |
| 2013/0341882 A1 | * | 12/2013 | Ehrlich | B60G 3/00 280/124.128 |
| 2014/0327219 A1 | * | 11/2014 | Perri | B60G 11/08 280/124.109 |
| 2017/0253099 A1 | * | 9/2017 | Durkovic | B60G 3/265 |

FOREIGN PATENT DOCUMENTS

| | | | | |
|---|---|---|---|---|
| FR | 562956 A | | 11/1923 | |
| FR | 2605940 A1 | | 5/1988 | |
| GB | 414759 | | 8/1934 | |
| GB | 414882 A | | 8/1934 | |
| JP | 63041211 A | * | 2/1988 | ............ B60G 11/08 |
| JP | 02133212 A | * | 5/1990 | ............ B60G 11/08 |
| WO | 2009028942 A1 | | 3/2009 | |
| WO | 2010072563 A1 | | 7/2010 | |

OTHER PUBLICATIONS

European Official Action (dated Mar 7, 2018) for corresponding European App. EP14906103.8.
Japanese Official Action (dated Oct. 2, 2018) for corresponding Japanese App. 2017-515912.

* cited by examiner

WHEEL SUSPENSION WITH CENTRALLY PIVOTED TRANSVERSE LEAF SPRING

BACKGROUND AND SUMMARY

The invention relates to a wheel suspension arrangement for a vehicle having a longitudinal direction, a transverse direction and a vertical direction. The wheel suspension arrangement comprising a wheel holder for supporting a vehicle wheel, wherein a first vertical end region of the wheel holder is pivotally attached to a vehicle support structure by means of a rigid control arm, and wherein the second vertical end region of the wheel holder is attached to the vehicle support structure by means of a leaf spring. A longitudinal direction of the leaf spring is arranged substantially in the transverse direction of the vehicle. The leaf spring is pivotally attached to the vehicle support structure at a transverse centre region of the vehicle, and the leaf spring is located vertically offset from a pivotal attachment location of the leaf spring.

The invention is suitable for being applied in heavy-duty vehicles, such as trucks and buses. Although the invention will be described with respect to a truck, the invention is not restricted to this particular vehicle, but may also be used in other vehicles such as busses and automobiles.

There are many different wheel suspension arrangements available for road vehicles, such as dependent suspension arrangements having a rigid or semi-rigid beam connecting the transversally opposite wheels of a vehicle, or individual wheel suspension arrangements, such as MacPherson design and double wishbone design. The wheel suspension arrangements differs mainly in terms of how the vehicle wheels are connected to the chassis of the vehicle and the wheel suspension motion is controlled in terms of suspension motion path, suspension motion length and damping of suspension motion. Each wheel suspension arrangement is associated with certain advantages and disadvantages in terms of manufacturing cost, weight, robustness, required maintenance cost, vehicle handling, tire wear, etc. U.S. Pat. No. 2,149,895 (FIG. 3) shows a suspension design of a vehicle having as its object improvement of the effect of the springing of the vehicle.

A wheel suspension arrangement is the arrangement of springs, shock absorbers and linkages that connects a vehicle to its wheels and allows relative motion between the two. It is known that the double wishbone suspension design generally provides very good vehicle handling and provides many different suspension parameters for enabling configuration of the suspension arrangement according to the each specific vehicle type. The double wishbone suspension design is however generally also conceived as having a relatively high manufacturing and maintenance cost due the high complexity of the linkage and elastic mountings.

The double wishbone design also has drawbacks in terms of varying wheel camber angle upon vehicle body roll, which typically occurs during vehicle cornering. A varying camber angle is generally undesirable because this results in a camber angle that offset from a desired, optimal, camber angle during certain vehicle operating conditions. Driving a vehicle with a camber angle offset from a desired camber angle generally results in reduced vehicle handling performance and in increased tire wear.

It is desirable to provide a wheel suspension arrangement that provides low variation in camber angle during vehicle driving while avoiding costly and complex design solutions.

According to an example embodiment of the invention, the wheel suspension arrangement comprises a wheel holder for supporting a vehicle wheel, wherein a first vertical end region of the wheel holder is pivotally attached to a vehicle support structure by means of a rigid control arm, wherein a second vertical end region of the wheel holder is attached to the vehicle support structure by means of a leaf spring, wherein a longitudinal direction of the leaf spring is arranged substantially in the transverse direction of the vehicle, wherein the leaf spring is pivotally attached to the vehicle support structure at a transverse centre region of the vehicle, wherein a centre of the leaf spring is located vertically offset from a pivotal attachment location of the leaf spring, and wherein the pivotal attachment location of the leaf spring is vertically offset towards the side of the rigid control arm.

By providing the wheel holder with two vertically offset attachments to the vehicle support structure, a suspension design having wheel motion geometry similar to a double wishbone design is accomplished. However, the use of a transverse leaf spring as one linkage between the wheel holder and the vehicle support structure results in an additional functionality in terms of shock absorption due to the inherent spring constant of the leaf spring. The additional spring stiffness functionality of the leaf spring enables omission, or at least reduced capacity, of the conventional spring stiffness capacity by means of coil springs or air springs, such that a more compact and more cost-efficient design of the wheel suspension arrangement is enabled.

The leaf spring provides a slightly different wheel holder motion geometry compared with the motion geometry provided by means of a bar linkage of a conventional double wishbone suspension design. However, the difference is relatively small and the leaf spring geometry during bending can be adapted according to the linkage design of the other wheel holder linkage, such that the leaf spring can relatively accurate simulate the motion geometry of a conventional double wishbone suspension design.

Moreover, by providing the pivotal attachment location of the leaf spring vertically offset towards the side of the rigid control arm, a reduced camber variation of the wheels during vehicle body roll is accomplished, such that improved vehicle handling and reduced tire wear is accomplished during vehicle body roll.

According to some example embodiments, the leaf spring may pivotally be attached to the vehicle support structure by means of a spring holder which is rigidly connected to the leaf spring, The spring holder may be pivotally attached to the vehicle support structure around a substantially horizontal axis at the transverse centre region of the vehicle, and the leaf spring may be located vertically offset from a pivotal attachment location of the spring holder. Use of a spring holder provides a cost effective solution for accomplishing the desired pivotal connected of the leaf spring to the vehicle support structure.

According to some example embodiments, a first vertical distance between the pivotal attachment location and a control arm extension at a transverse centre of the vehicle may be less than 50% of a second vertical distance between the leaf spring and said control arm axis at the transverse centre of the vehicle, specifically the first distance may be less than 25% of the second distance, more specifically the first distance may be less than 10% of the second distance, and yet more specifically the pivotal attachment location substantially may coincide with the control arm extension at a transverse centre of the vehicle. Reduced distance between the pivotal attachment location and the control arm extension at a transverse centre of the vehicle results in decreased camber angle variation during vehicle body roll.

According to some example embodiments, the wheel suspension arrangement further may comprise body roll damper unit and/or a body roll spring unit mounted such that pivotal motion of the leaf spring around said pivotal attachment location is affected by the body roll damper unit and/or the body roll spring unit. A body roll spring unit assists the existing wheel suspension shock absorption means for improving the vehicle anti-roll behaviour. In addition or separately, the body roll damper unit can be set to provide a relatively stiff pivotal connection of the leaf spring during short duration forces, such as those occurring when driving straight on a bumpy road where each unsymmetrical bump generates a pivoting momentum of the leaf spring. Thereby, the leaf spring will remain relatively fixed in its angular pivotal position during straight driving and the wheel suspension arrangement will operate similar to a double wishbone suspension system. However, during vehicle cornering, a long term unsymmetrical force will act on the body roll damper unit such that the leaf spring will pivot around its pivotal connection for providing the desired camber compensation. Furthermore, the provision of a body roll spring unit and/or body roll damper unit uniquely for controlling the vehicle body roll motion behaviour enables improved possibility of tuning the wheel suspension arrangement, because body roll suspension and body bump suspension can be targeted individually to a higher degree.

According to some example embodiments, the body roll damper unit and/or a body roll spring unit may be connected to the vehicle support structure and to at least one of the leaf spring, the spring holder or another member that is directly or indirectly rigidly connected to the leaf spring or spring holder.

According to some example embodiments, the body roll damper unit may be a rotational damper. A rotational damper provides a compact solution.

According to some example embodiments, the first vertical end region of the wheel holder may correspond to an upper vertical end region of the wheel holder, and the second vertical end region of the wheel holder may correspond to a lower vertical end region of the wheel holder. Provision of the leaf spring at a lower position may be advantageous in terms of vehicle packing because the leaf spring requires a certain space for shock absorption.

According to some example embodiments, the first vertical end region of the wheel holder may correspond to a lower vertical end region of the wheel holder, and the second vertical end region of the wheel holder may correspond to an upper vertical end region of the wheel holder. Provision of the leaf spring at the upper vertical end region is advantageous in terms vehicle roll rigidity because the centre of roll of the vehicle support structure is located higher in this embodiment during roll motion, and the vehicle roll rigidity is a function of the vertical distance between the centre of roll and the vehicle mass centre.

According to some example embodiments, a transverse length of a Ross line of the leaf spring may correspond substantially to a transverse length of the rigid control arm measured between its inner and outer pivotal attachment locations. The transverse length of the Ross line determines the geometrical motion of the ends of the leaf spring during suspension motion of the vehicle. By selecting the transverse length of the Ross line to correspond substantially to the transverse length of the rigid control arm substantially zero, or at least very small, camber variation during vertical motion of an associated wheel is enabled. Vertical wheel motion typically occurs when driving a vehicle straight on a bumpy road.

According to some example embodiments, an inner pivotal attachment location of the rigid control arm to the vehicle support structure may be located in the same longitudinally extending vertical plane as a Ross point of the leaf spring. This suspension layout, in combination with the previously defined length of the Ross line, assists in enabling the desired substantially zero, or at least very small, camber variation during vertical motion of an associated wheel.

According to some example embodiments, an outer pivotal attachment location of the rigid control arm to the wheel holder may be located in the same longitudinally extending vertical plane as an attachment location of the leaf spring to the wheel holder. This suspension layout, in combination with the previously defined length of the Ross line, assists in enabling the desired substantially zero, or at least very small, camber variation during vertical motion of an associated wheel.

According to some example embodiments, the Ross line of the leaf spring may be parallel with a straight line extending between an inner and outer pivotal attachment location of the rigid control arm as viewed from the front of the vehicle. This suspension layout, in combination with the previously defined length of the Ross line and inner or outer pivotal attachment location, assists in enabling the desired substantially zero, or at least very small, camber variation during vertical motion of an associated wheel.

According to some example embodiments, each transverse end region of the leaf spring may be connected to an individual wheel holder. Direct connection to a wheel holder at each side of the leaf spring provides a compact and cost-efficient suspension design.

According to some example embodiments, the spring holder may be rigidly connected to the leaf spring at a single central location. The single central connection provides an equal distribution of forces on the left and right side of the leaf spring, as well as a costs-effective design.

According to some example embodiments, the spring holder may at least partly surround a portion of the leaf spring for establishing the rigid connection. This design of the rigid connection provides high robustness and reliability.

According to some example embodiments, the spring holder may clamp the leaf spring over a portion extending at least 50 millimeters in the transverse direction for establishing the rigid connection, specifically at least 75 millimeters in the transverse direction, and more specifically at least 100 millimeters in the transverse direction. The length of the clamping portion is a parameter influencing the torque level that may be transferred between spring holder and leaf spring while having a high internal angular stability between the leaf spring and spring holder. This is particularly desired when a damping unit and/or shock absorption unit is connected to the spring holder.

According to some example embodiments, the spring holder may clamp the leaf spring over a transverse portion, and a ratio between a transverse clamping portion of the spring holder to the distance between the leaf spring to the pivotal attachment location is in the range of 1:0.5-1:5, specifically 1:2-1:4. As described above, the clamping portion is a parameter influencing the torque level that may be transferred between spring holder and holder.

According to some example embodiments, the rigid control arm may comprise at least two longitudinally spaced apart pivotal connections to the vehicle support structure. The spaced apart locations provide means for transferring increased level of longitudinal stability between the wheel holder and vehicle support structure. This is particularly advantageous at suspension of a wheel that is arranged to transmit relatively high levels of longitudinal force between the vehicle support structure and wheel holder, such as during vehicle braking or acceleration.

According to some example embodiments, the rigid control arm may be manufactured to form a single entity. This result in reduced manufacturing costs compared with a multi-unit control arm. It is understood here that the wheel suspension arrangement comprises only one rigid control arm, except possibly an additional rigid steering linkage.

According to some example embodiments, the second vertical end region of the wheel holder may be attached to the vehicle support structure only by means of the leaf spring. This means that the second vertical end region of the wheel holder is free from any additional suspension control arms, except possibly an additional rigid steering linkage.

According to some example embodiments, the wheel suspension arrangement further may comprise a body suspension damper unit and/or a body suspension spring unit mounted such that vertical motion of the wheel holder is affected by the body suspension damper unit and/or the body suspension spring unit.

According to some example embodiments, the body suspension damper unit and/or a body suspension spring unit may be mounted, directly or indirectly, between the vehicle support structure and one of the rigid control arm; the wheel holder or leaf spring.

According to some example embodiments, the wheel holder may form a king post provided with a wheel spindle holder for a steerable wheel.

According to some example embodiments, the wheel holder may be provided with a wheel hub for a, driven or non-driven, non-steerable wheel.

According to some example embodiments, a vehicle comprising a wheel suspension arrangement as discussed above may be provided.

The term control arm extension herein refers to an inward extension of a straight line extending between an inner and outer pivotal attachment location of the rigid control arm as viewed from the front of the vehicle, wherein the extension extends in the same direction as the straight line.

Further advantages and advantageous features of the invention are disclosed in the following description and in the dependent claims.

BRIEF DESCRIPTION OF THE DRAWINGS

With reference to the appended drawings, below follows a more detailed description of embodiments of the invention cited as examples.

In the drawings.

DETAILED DESCRIPTION

Various aspects of the invention will hereinafter be described in conjunction with the appended drawings to illustrate and not to limit the invention, wherein like designations denote like elements, and variations of the inventive aspects are not restricted to the specifically shown embodiments, but are applicable on other variations of the invention.

Figure 1:
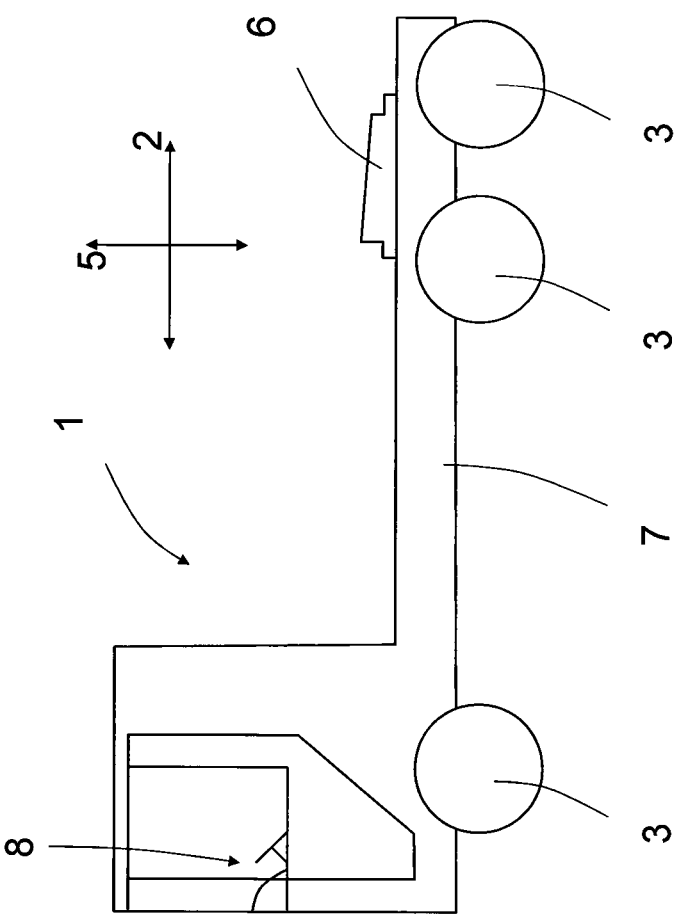
FIG. 1 shows a side view of a truck.

FIG. 1 illustrates schematically a vehicle 1 suitable for using a wheel suspension arrangement according to an aspect of the invention. The vehicle has a longitudinal direction 2, a transverse direction 4 and a vertical direction 5 and may be any type of road vehicle having wheel suspension arrangement, in particular heavy vehicles, such as trucks, buses, and constructional vehicles, but also automobiles or railbound vehicles. The vehicle 1 shown in FIG. 1 illustrates a heavy truck for being connected to a trailer via a fifth wheel 6. The truck further comprises a frame 7, a driver's cabin 8 and a pair of steerable front wheels 3 and two pairs of rear wheels 3. Each of the pair of front and rear wheels 3 comprises a wheel suspension arrangement.

Each of the pair of front and rear wheels 3 comprises an individual or dependent wheel suspension arrangement, wherein the individual wheel suspension arrangement is characterised in an independent suspension of the left and right side wheel 3, whereas the dependent suspension arrangement is characterised in that suspension motion of one of the left and right side wheel affects to suspension of the other wheel of the pair of wheels 3. MacPherson or double wishbone suspension arrangements are examples of individual suspension arrangements, and a suspended rigid or semi-rigid axle connecting the left and right side wheel are examples of dependent suspension arrangements.

Figure 2:
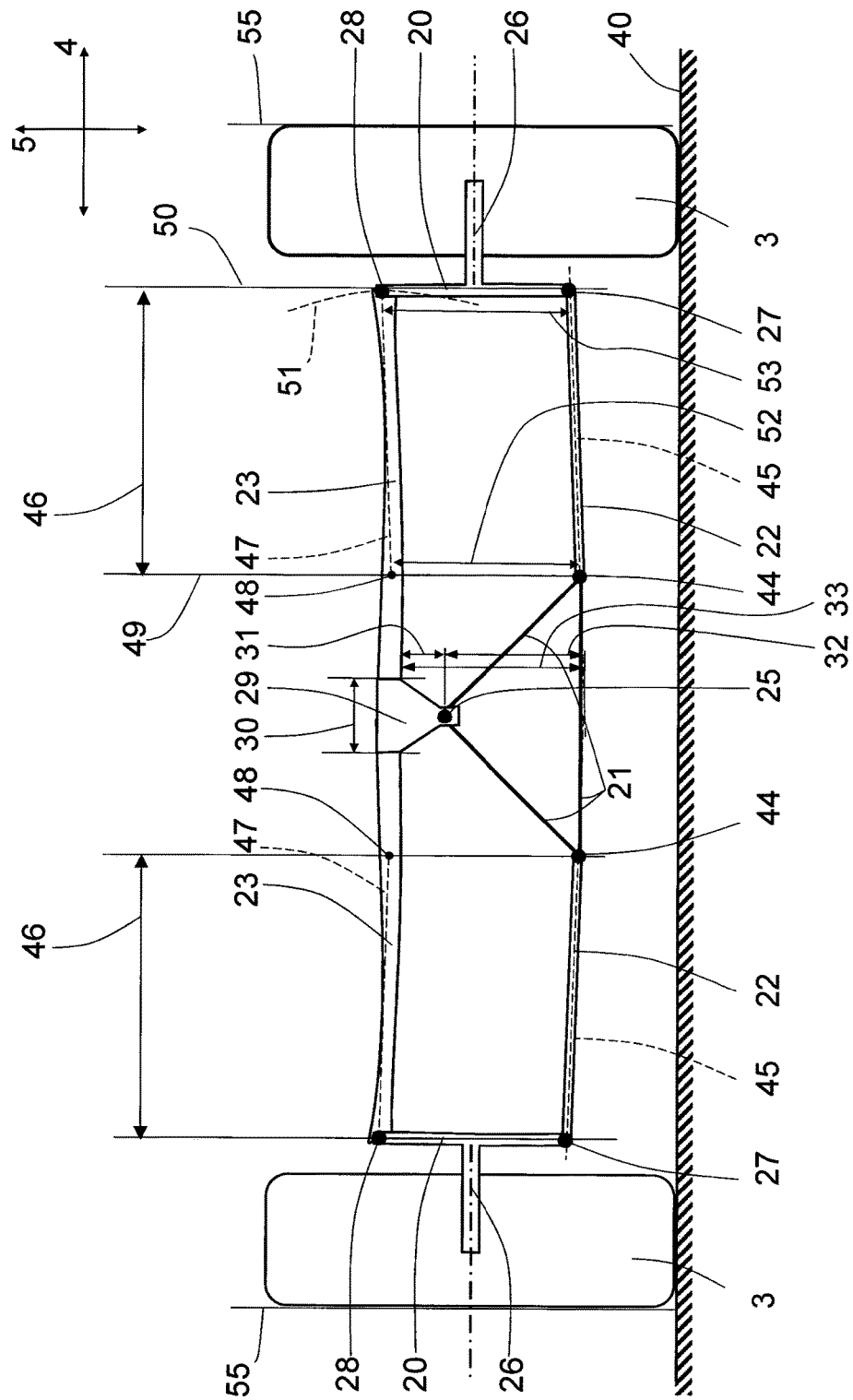
FIG. 2 shows an example embodiment of a wheel suspension arrangement.

FIG. 2 schematically shows an example embodiment of the wheel suspension arrangement comprising, on each transverse side thereof, a wheel holder 20 for supporting a vehicle wheel 3. The example wheel suspension arrangement is suitable for carrying driven, non-driven, steerable or non-steerable wheels. The wheel holder 20 may typically be provided with a wheel shaft 26 carrying a wheel hub (not shown) configured to be fastened to a wheel 3.

According to an embodiment, the wheel holder 20 forms a king post provided with a wheel spindle holder for a steerable wheel 3.

A first vertical end region of the wheel holder 20 is pivotally attached to a vehicle support structure 21 by means of a rigid control arm 22, and a second vertical end region of the wheel holder 20 is attached to the vehicle support structure 21 by means of a leaf spring 23. In the embodiment of FIG. 2, the first vertical end region of the wheel holder 20 corresponds to a lower vertical end region of the wheel holder 20, and the second vertical end region of the wheel holder corresponds to an upper vertical end region of the wheel holder.

An upper and lower pivotal attachment 27, 28 of the leaf spring 23 and rigid control arm 22 to the wheel holder 20 respectively, may be realised in many ways, and may for example be realised by means of cylindrical rubber bushing mounted in a housing, or a ball joint in case the wheels 3 are steerable.

A longitudinal direction of the leaf spring 23 is arranged substantially in the transverse direction 4 of the vehicle 1. The leaf spring 23 is pivotally attached to the vehicle support structure 21 at a transverse centre region of the vehicle 1. The leaf spring 23 may be pivotally attached to the vehicle support structure by means of a spring holder 29. The spring holder 29 may be rigidly connected to the leaf spring 23 at a single central location. The spring holder may be pivotally attached to the vehicle support structure around a substantially horizontal axis at the transverse centre region of the vehicle.

The size, shape and form of the spring holder 29 are selected according to the specific need of the application. For example, the spring holder 29 may at least partly surround a portion of the leaf spring 23 for establishing the rigid connection. The spring holder 29 may according to a further example clamp the leaf spring 23 over a portion 30 extending at least 50 millimeters in the transverse direction 4 for establishing the rigid connection, specifically at least 75 millimeters in the transverse direction 4, and more specifically at least 100 millimeters in the transverse direction 4.

A centre of the leaf spring 23 in a transverse direction 4 is located vertically offset a distance 31 from a pivotal attachment location 25 of the leaf spring 23, wherein the pivotal attachment location 25 of the leaf spring 23 is vertically offset towards the side of the rigid control arm 22.

The configuration described above, where the wheel holder is pivotally attached to the vehicle support structure via upper and lower linkage is very similar to a double wishbone suspension design, i.e. a suspension design that provides very good vehicle handling. The conventional double wishbone design with upper and lower pivotally attached rigid control arms have however been modified by replacing one rigid control arm with a leaf spring. The modification results in many surprising good technical effects, such as less pivotal mountings making the suspension arrangement more reliable, and inherent built-in spring force by means of the leaf spring, such that additional conventional coil springs are superfluous or can be made smaller.

Moreover, by means of the pivotal attachment of the leaf spring to the vehicle support structure, with a centre of the leaf spring 23 in a transverse direction 4 is located vertically offset a distance 31 from a pivotal attachment location 25 of the leaf spring 23, and with the pivotal attachment location 25 of the leaf spring 23 being vertically offset towards the side of the rigid control arm 22, a technical advantage in terms of reduced camber angle variation during vehicle body roll is enabled, compared with a conventional double wishbone suspension arrangement.

During vertical motion of one or both wheels 3, the suspension arrangement will function similar to a double wishbone suspension and exhibit substantially zero camber variation, depending on the design and operating characteristic of the leaf spring. However, during body roll motion, as resulting from driving through a bend or simply turning the vehicle for same reason, the pivotal mounting of the leaf spring reduces the camber error occurring upon body roll. The camber error compensation provided by the example wheel suspension arrangement depends on many factors, such as the design and operating characteristic of the leaf spring, the level of offset, etc.

The spring holder may according to an example clamp the leaf spring over a transverse portion 30, and a ratio between a transverse clamping portion 30 of the spring holder 29 to the distance 31 between the leaf spring to the pivotal attachment location is in the range of 1:0.5-1:5, specifically 1:2-1:4.

A first vertical distance 32 between the pivotal attachment location 25 and a control arm extension at a transverse centre of the vehicle is less than 50% of a second vertical distance 33 between the leaf spring and said control arm axis at the transverse centre of the vehicle, specifically the first distance 32 is less than 25% of the second distance 33, more specifically the first distance 32 is less than 10% of the second distance 33, and yet more specifically the pivotal attachment location 25 may be located substantially coinciding with the control arm extension at a transverse centre of the vehicle 1. It can be mathematically determined that the level of camber error during body roll is reduced by reducing the first vertical distance 32. This suspension geometry applies when the wheel suspension arrangement is transmitting the load of vehicle to the underlying ground 40 via the wheels 3, i.e. the normal operating geometry of the wheel suspension arrangement.

Figure 3:
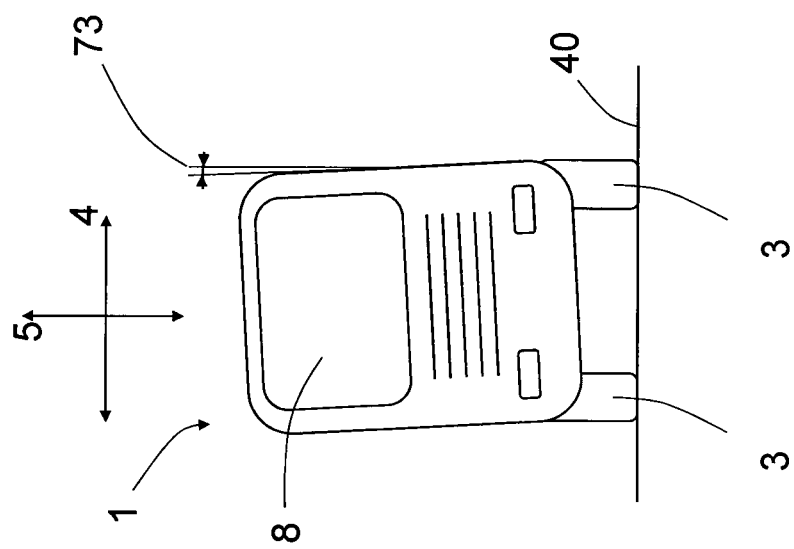
FIG. 3 shows a front view of a truck having a body roll angle deviating from a vertical direction.

The vehicle support structure 21 typically comprises a frame 7 or chassis of a vehicle and has been illustrated in a simplified manner in FIG. 1. The vehicle support structure is a rigid part that forms the basis of the vehicle, and other components, such as powertrain, driver's cabin 8, cargo containers, etc. are mounted on the vehicle support structure. During vehicle body roll, such as when driving through a corner, the centrifugal force occurring on the vehicle will generate a torque momentum dependent on the distance between the underlying ground 40 and the vehicle centre of mass. The vehicle support structure including all components attached thereto will deviate from its natural angular position towards a transverse side, as schematically illustrated in FIG. 3. In FIG. 3, the vehicle 1 is schematically illustrated from the front when driving forward though a left bend. The torque momentum will cause suspension springs on the bend outer side to become compressed, such that the vehicle support structure, including the driver's cabin 8, becomes tilted towards the outside of the bend. The angular position of the vehicle support structure is here illustrated as being deviated from a natural, stillstand, state with an angle 73, herein referred to as vehicle roll angle 73. It is here assumed that the driver's cabin 8 has the same angular position as the vehicle support structure. Both the left and right side wheels 3 are in contact with the underlying support structure 40. As comparison, during small wheel vertical motion due to road bump or the like when straight, the vehicle roll angle 73 will remain essentially fixed in the natural, undeviated, state.

The rigid control arm 22 used for connecting the wheel holder 20 to the vehicle support structure 21 may be manufactured to form a single rigid entity. According to the example embodiment of FIG. 2, the rigid control arm is pivotally connected to the vehicle support structure 21 at an inner pivotal attachment location 44 and to the wheel holder at an outer pivotal attachment location 27, which in this embodiment coincide with the lower pivotal attachment 27 of the wheel holder. An angular position of the rigid control arm is defined as the angle between the underlying support surface 40 and a straight line 45 extending between an inner and outer pivotal attachment location of the rigid control arm as viewed from the front of the vehicle.

If the leaf spring is arranged to transmit the necessary level of longitudinal force to the wheel holder the control arm does not have to perform this task also and can consequently by designed for only transmitting forces in the longitudinal direction of the control arm. However, if the control arm is configured to transmit longitudinal forces to the wheel holder the control arm may comprise two longitudinally spaced apart pivotal connections to the vehicle support structure.

According to an example embodiment, the vertical end region of the wheel holder being attached to the vehicle support structure by means of the leaf spring is free from any additional connections to the vehicle support structure for the purpose of providing a cost-effective, compact and reliable solution. Similarly, the control arm is preferably made of a single piece, but a multi-piece control arm system may alternatively be implemented.

The leaf beam may comprise a plurality of elongated metal parts, such as flexible sheet steel metal bars, that are stacked together and clamped together to form a single entity. The individual metal bars of the leaf spring may have individual lengths, thicknesses, width, and material composition. Moreover, the finished leaf spring may comprise varying outer dimensions over the length of the leaf spring, such as thicker closer to the centre of the wheel suspension arrangement. Alternatively, the leaf spring may comprise a single flexible member manufactured to have similar operating characteristic as the multi-unit leaf spring. The leaf spring 23 in the figures has been only schematically depicted and may be either a single or multi-unit part.

For contributing to a motion geometry similar to a double wishbone design, the transverse length 46 of the Ross line 47 of the leaf spring in FIG. 2 corresponds substantially to a transverse length of the rigid control arm measured between its inner and outer pivotal attachment locations.

Furthermore, also for contributing to a motion geometry similar to a double wishbone design, an inner pivotal attachment location 44 of the rigid control arm 22 to the vehicle support structure is located in the same longitudinally extending vertical plane 49 as a Ross point 48 of the leaf spring.

Furthermore, also for contributing to a motion geometry similar to a double wishbone design, an outer pivotal attachment location 27 of the rigid control arm 22 to the wheel holder 20 is located in the same longitudinally extending vertical plane 50 as an attachment location 28 of the leaf spring 23 to the wheel holder 20.

Furthermore, also for contributing to a motion geometry similar to a double wishbone design, the Ross line 47 of the leaf spring 23 is parallel with the straight line 45 extending between inner and outer pivotal attachment locations 44, 27 of the rigid control arm 22 as viewed from the front of the vehicle.

Furthermore, also for contributing to a motion geometry similar to a double wishbone design, the vertical distance 52 between the inner attachment location 44 of the rigid control arm 22 and the Ross point 48 should be substantially equal to the vertical distance 53 between the upper and lower pivotal attachment locations 27, 28 of the wheel holder 20.

The terms "Ross point" and "Ross line" are well-known to the skilled person of leaf spring technology. These parameters can be mathematically calculated for each specific leaf spring configuration, for example using commercially available computer programs. Said parameters can alternatively be determined by means of conducting some experimental tests of the leaf spring. In short, the Ross point and Ross line of the leaf spring may be described with reference to FIG. 2, where there is provided a cantilever suspended leaf spring 23 with a Ross point 48 and a Ross line 47. The motion geometry of an outer distal end of the leaf spring, i.e. the attachment location 28 of the leaf spring 23 to the wheel holder 20, will closely follow the circumference of an arc 51 of a circle having radius equal to the length of the Ross line 47 and located with its centre at the Ross point 48, under varying load on the leaf spring. Cantilever suspended leaf spring refers to leaf spring having one side attached to a rigid structure and the other side free.

The camber angle is here defined as the deviation angle of the wheel from a vertical orientation 55 seen from the front or rear of the vehicle.

The wheel suspension arrangement of FIG. 2 represents a relatively non-complex arrangement having a certain level of vertical stiffness capacity by means of the spring constant of the leaf spring. However, in most cases, the wheel suspension arrangement will be additionally provided with a combination of a body suspension damper unit and a body suspension spring unit mounted such that vertical motion of the wheel holder is affected by the body suspension damper unit and/or the body suspension spring unit. An example embodiment having such additional components is illustrated in FIG. 4.

Figure 4:
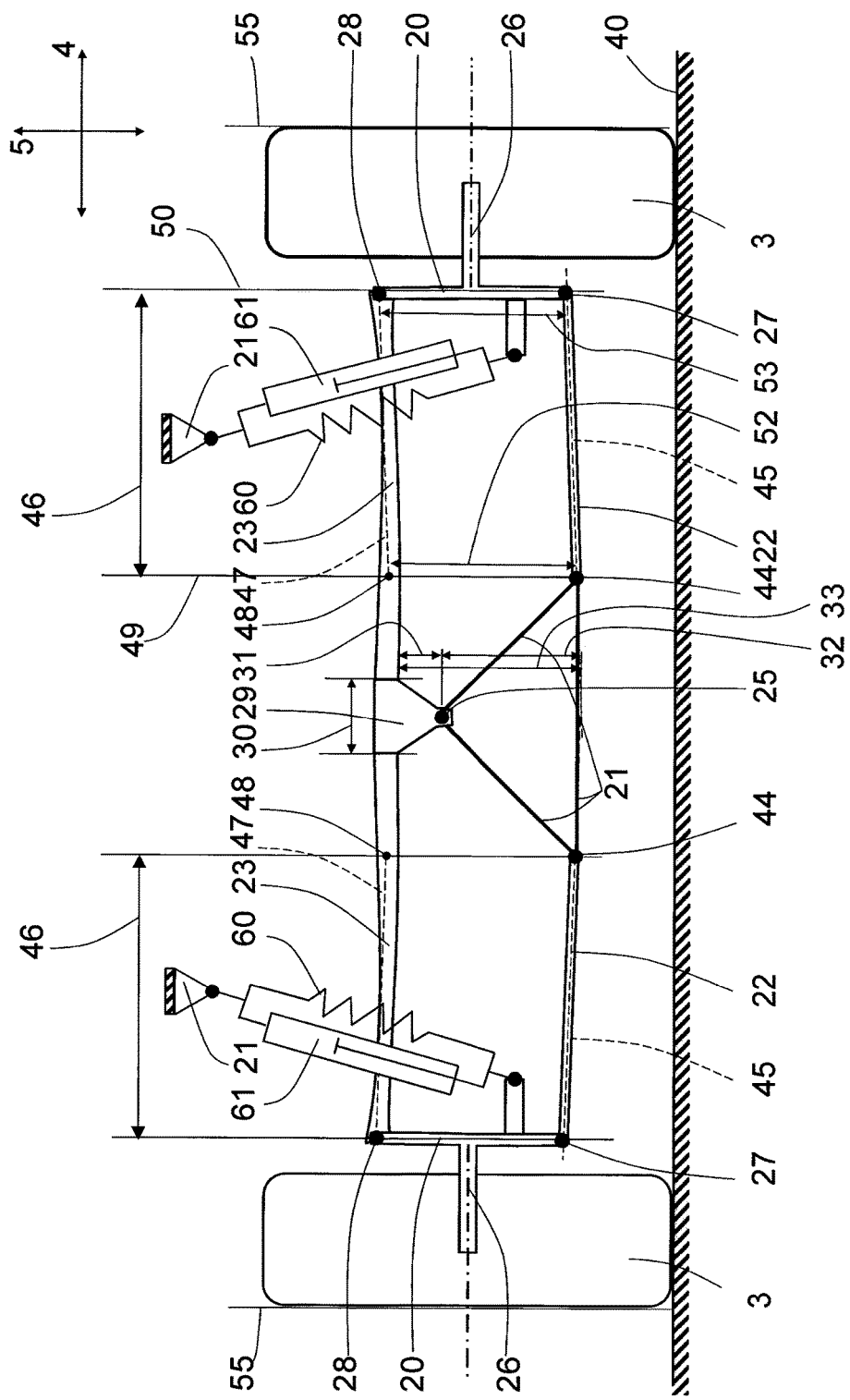
FIG. 4 shows an example embodiment of a wheel suspension arrangement.

According to the example embodiment of FIG. 4, the body suspension spring unit 60 and body suspension damper unit 61 are both mounted between the vehicle support structure 21 and the wheel holder 20. The fixed coupling between the different parts of the vehicle support structure is not shown in the schematic drawings but they are readily understandably by the skilled person. The fact that both the leaf spring and body suspension spring units 60 jointly provide the total vehicle suspension capacity allows for tuning of the spring components such as to provide improved performance. For example, both the leaf spring and body suspension spring units 60 will jointly absorb vertical motion of the wheels caused by uneven roads during straight driving. However, the leaf spring will not be active for resisting roll behaviour of the vehicle body during driving in a bend due to the pivotal attachment of the leaf spring to the vehicle support structure 21.

The body suspension damper unit 61 and a body suspension spring unit 60 have been disclosed mounted directly to a portion of the wheel holder 20. However, other designs are possible, such as direct or indirect connection of the body suspension damper unit 61 and a body suspension spring unit 60 to a rigid control arm 22 or to the leaf spring 23.

Figure 5:
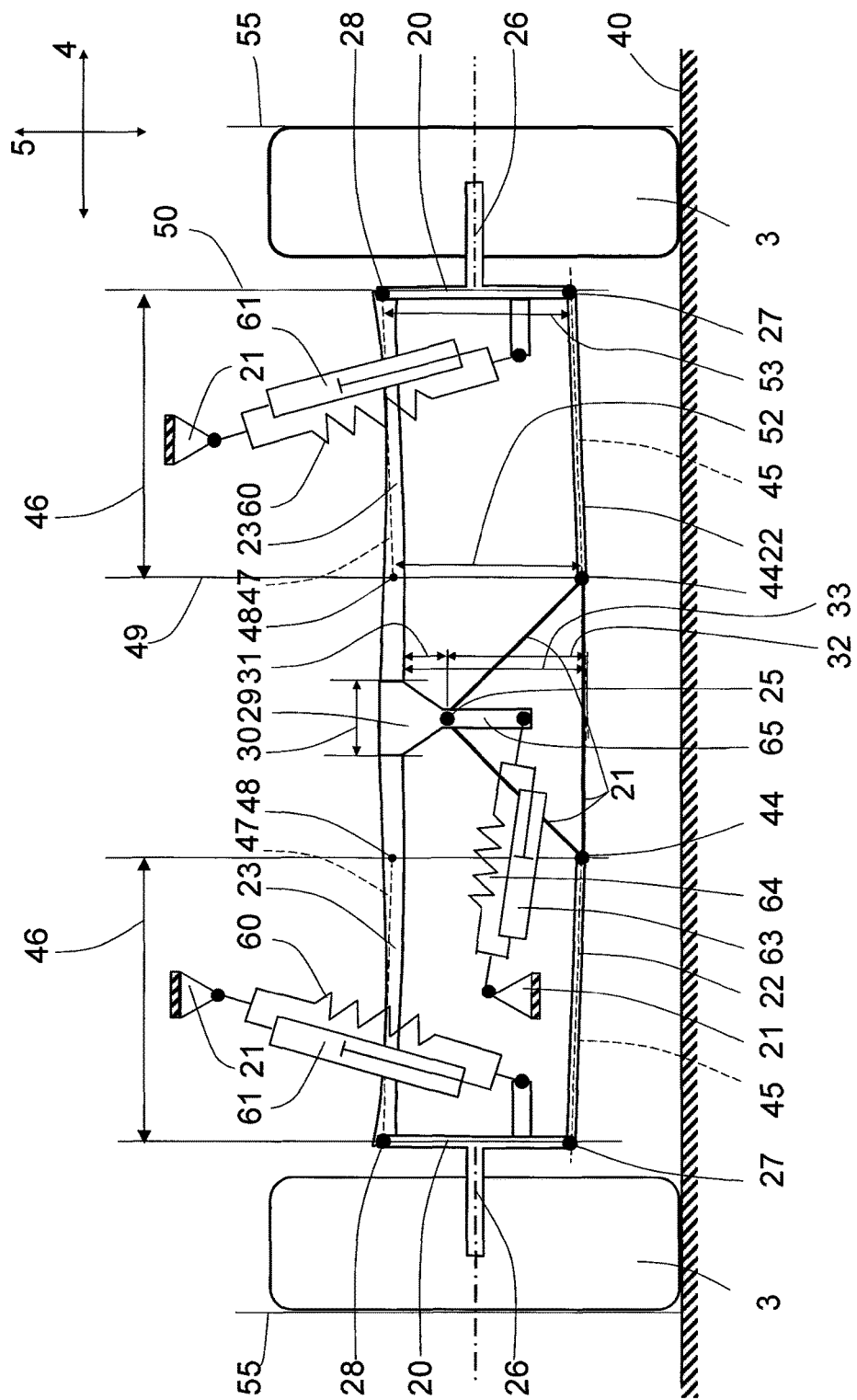
FIG. 5 shows an example embodiment of a wheel suspension arrangement.

According to yet a further example embodiment shown in FIG. 5, the wheel suspension arrangement further comprises body roll damper unit 63 and a body roll spring unit 64 mounted such that pivotal motion of the leaf spring 23 around said pivotal attachment location 25 is affected by the body roll damper unit 63 and the body roll spring unit 64. This allows even further tuning of the wheel suspension arrangement because the body roll damper unit and a body roll spring unit are mainly concerned with controlling the body roll motion. The body roll damper unit 63 is preferably set to resist pivotal motion of the spring holder 29 during driving straight on a road, i.e. when only vertical motion of one or both wheels 3 occurs due to uneven road surface. In this driving mode the wheel suspension arrangement thus functions essentially as a double wishbone suspension arrangement with additional shock absorption capacity by means of the leaf spring 23. However, during corner driving, the body will tend to roll and the body roll damper unit 63 damper will enable the spring holder to pivot for adapting its angular position to the body roll, thereby resulting in automatic camber error compensation that would otherwise occur during body roll motion.

The body roll damper unit 63 and body roll spring unit 64 are connected to the vehicle support structure 21 and to an engagement portion 65 of the spring holder 29, which engagement portion 65 is offset from the pivotal attachment location 25 of the spring holder 29 for the purpose of enabling torque transmission to the spring holder 29. The engagement portion 65 may for example extend from the spring holder 29 on an opposite side with respect to the leaf spring 23. The body roll damper unit 63 and body roll spring unit 64 could however alternatively be connected to the leaf spring or another member that is directly or indirectly rigidly connected to the spring holder.

According to example embodiment, the body roll spring unit 64 may be omitted and only the body roll damper unit 63 would be provided. According to still an example embodiment, the body roll damper unit 63 is designed as a rotational damper unit for enabling a compact design.

Figure 6:
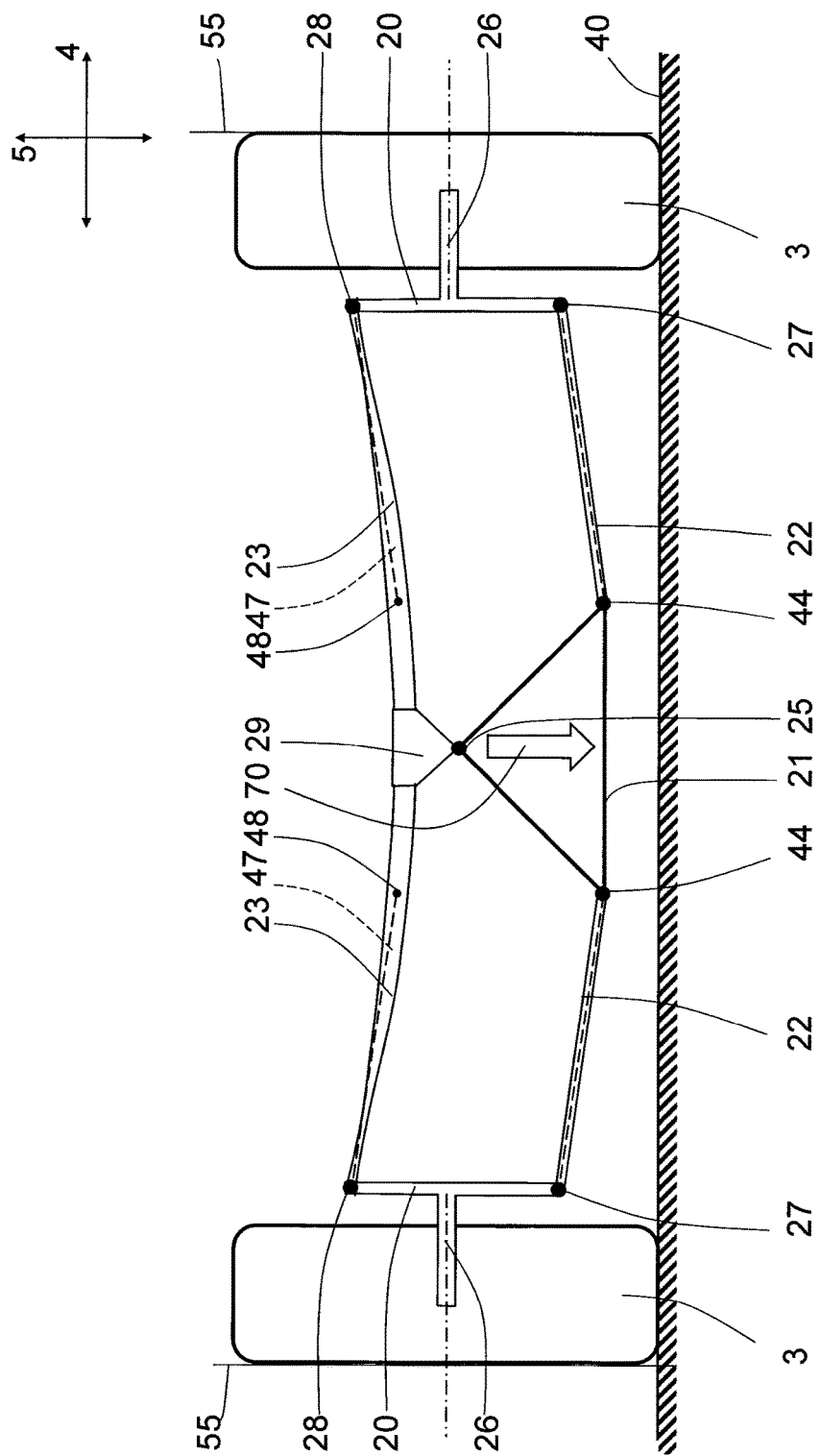
FIG. 6 shows an example embodiment of a wheel suspension arrangement during a parallel bump.

FIG. 6 illustrates the example embodiment of FIG. 2 during a parallel bump motion. The right and left wheels 3 are here shown vertically lifted a certain distance due to an elevated bump in the road or the like. The vehicle support structure 21 has not adapted to the new vertical position of the wheels and is shown displaced downwards in the direction of arrow 70. This figure illustrates the behaviour of the wheel suspension arrangement during vertical motion of the wheels. The Ross line 47 and Ross point 48 of the leaf spring 23 is selected to correspond to the size and installation of the rigid control arms 22, such as to provide a wheel suspension arrangement closely resembling a double wishbone design. As a result, the wheel camber variation during the vertical motion is very small, or substantially zero, at least in the operating range close the position of the suspension arrangement at stillstand. In FIG. 6, the deviation angle of the wheels 3 from a vertical orientation 55 is thus substantially zero.

Figure 7:
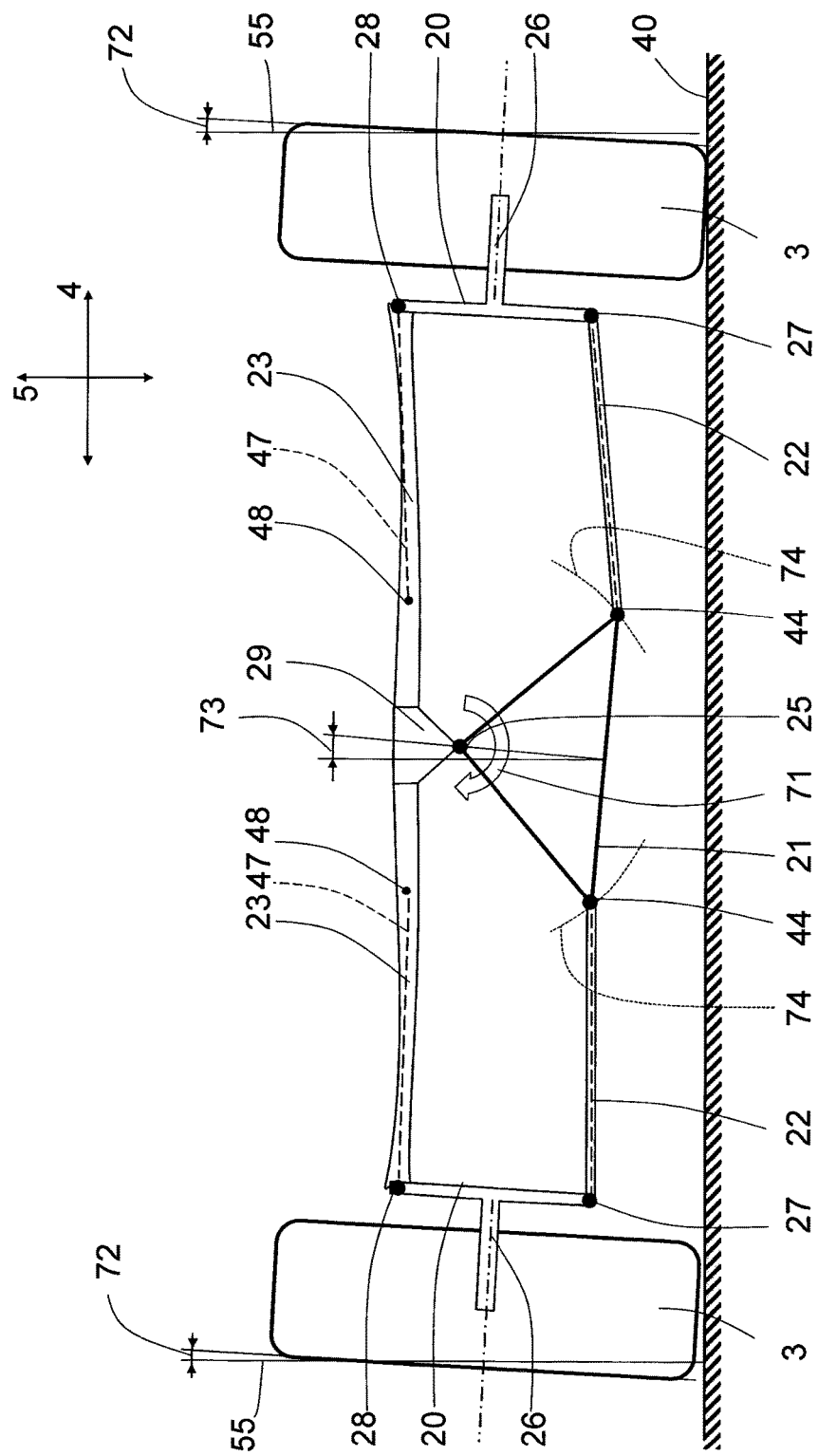
FIG. 7 shows an example embodiment of a wheel suspension arrangement during vehicle body roll.

FIG. 7 illustrates the example embodiment of FIG. 2 during a body roll motion, as shown by roll arrow 71. This may typically occur during driving through a bend in the road, such that the vehicle support structure becomes inclined with respect to the vertical axis. The wheel suspension arrangement according to example embodiment of FIG. 7 provides a reduced level of camber angle variation of the wheels compared with a conventional double wishbone suspension design. The improvement in terms of camber error compensation is realised by means of the pivotal attachment of the leaf spring 23 to the vehicle support structure 21 and by providing the pivotal attachment location 25 on the side of the rigid control arm of the leaf spring 23. As illustrated in FIG. 7, during pivotal motion of the leaf spring with respect to the vehicle support structure 21, the roll centre of the wheel suspension arrangement is located at the pivotal attachment location 25. Furthermore, the inner pivotal attachment locations 44 of the control arms 22 are displaced along arcs 74 of a circle having a centre at the pivotal attachment location 25. A certain level of translation of the inner pivotal attachment locations 44 in the transverse direction 4 is present, but due to the pivotal attachment of the leaf spring 23, the Ross points 48 of the leaf spring is not displaced with the same extent as an inner pivotal attachment location of a control arm would have been displaced in case a double wishbone would have been used. For this reason, the camber error does not grow large with the same extent, and the resulting deviation angle 72 of the wheels 3 from a vertical orientation 55 is thus reduced compared to a conventional double wishbone design. In fact, the leaf spring geometry is not changed much during vehicle roll, and is depicted as being substantially identical to a non-roll state of the vehicle. However, in practice, a certain level of left-right asymmetry of the leaf spring 23 will occur during body roll due to the increased load on the curve outer side part of the wheel suspension arrangement when driving through a curve. In the schematic and simplified illustration of FIG. 7, the left and right side wheel 3 will, during a certain body roll angle 71, exhibit substantially the same resulting deviation angle 72 and both wheels will be inclined in the same direction as the vehicle support structure.

Figure 8:
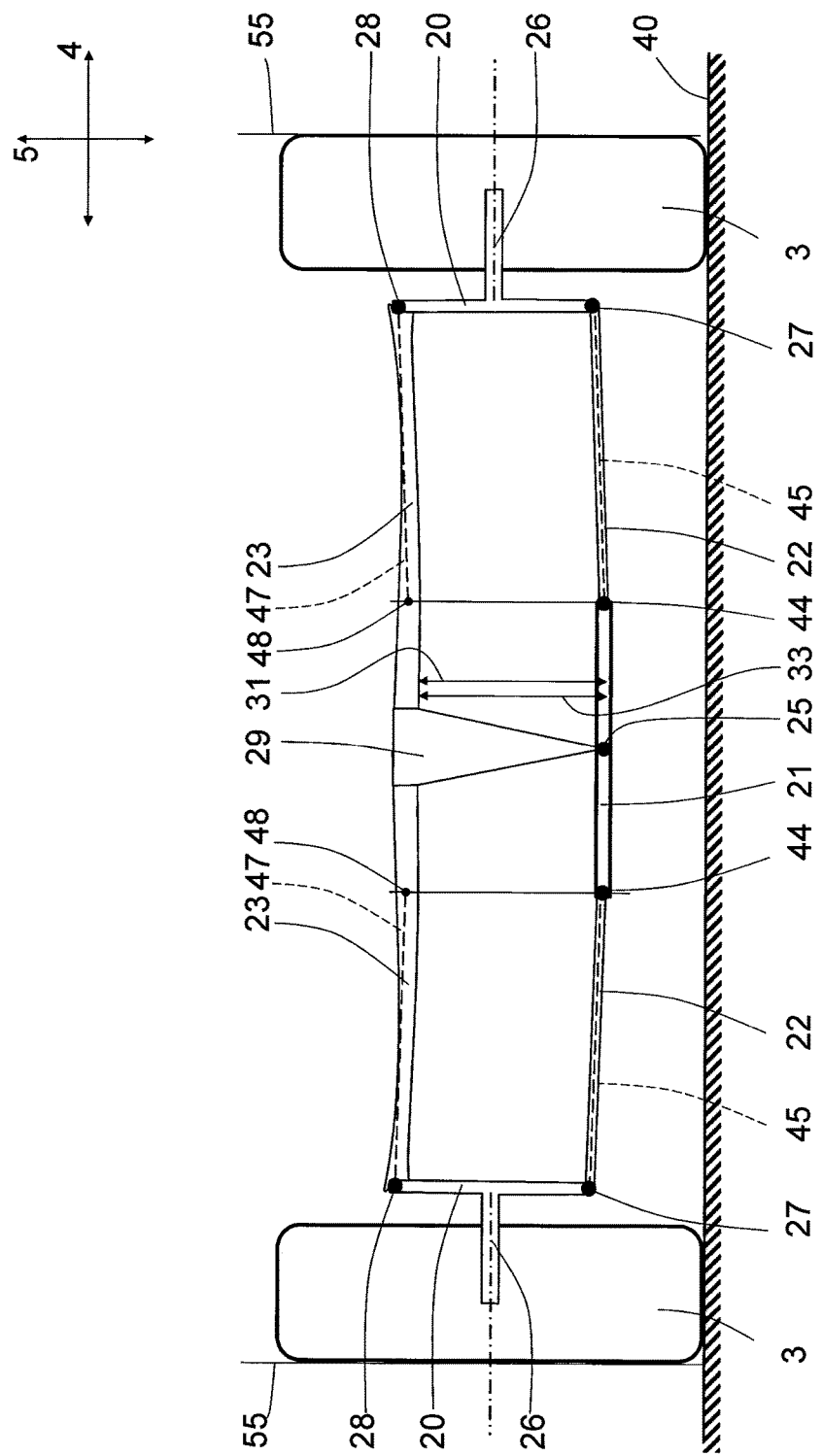
FIG. 8 shows an example embodiment of a wheel suspension arrangement.
Figure 9:
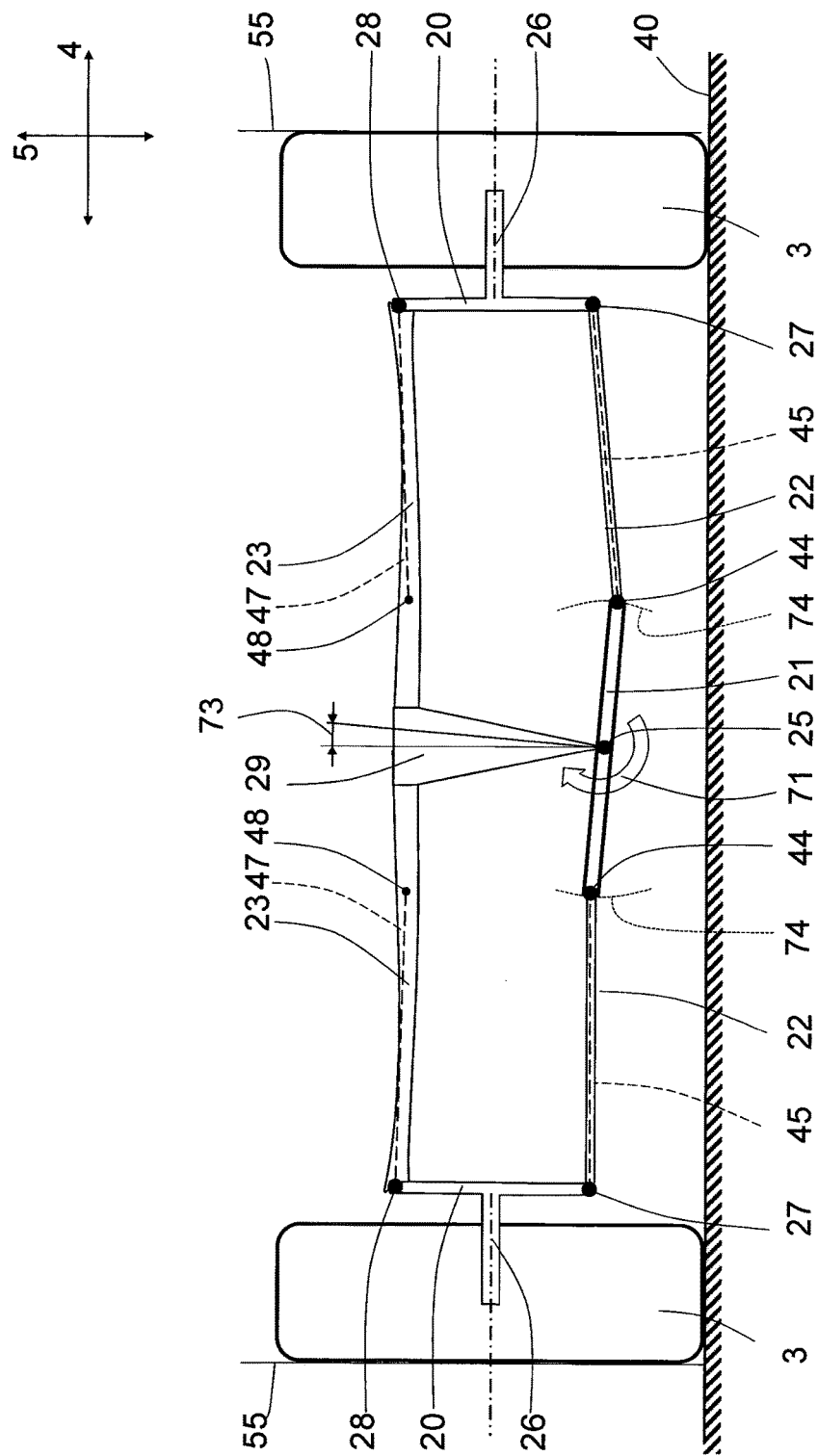
FIG. 9 shows an example embodiment of a wheel suspension arrangement during vehicle body roll.

FIG. 8 illustrates a schematic example embodiment where the pivotal attachment location 25 substantially coincides with the control arm extension at a transverse centre of the vehicle 1. This implies that said offset distance 31 is substantially identical to the second vertical distance 33, This layout provides even better camber error compensation during body roll than the design of FIG. 7. As illustrated in FIG. 9, which corresponds to the layout of FIG. 8, during vehicle roll motion, the inner pivotal attachment locations 44 of the control arms 22 are displaced along arcs 74 of a circle having a centre at the pivotal attachment location 25, but the inner pivotal attachment locations 44 are only displaced to a very limited extent in the transverse direction 4. This is the result of having the pivotal attachment location 25 substantially coinciding with the control arm extension at a transverse centre of the vehicle 1. The inner pivotal attachment locations 44 move in a circular fashion around the pivotal attachment location 25 during body roll, and the displacement in the transverse direction 4 should be minimized in order to reduce the variation in camber angle during body roll motion. As schematically shown in FIG. 9, although the vehicle body roll angle 71 is significant, the resulting deviation angle of both wheels 3 is substantially zero. This enables a wheel suspension arrangement that provides low variation in camber angle during vehicle driving while avoiding costly and complex design solutions.

Figure 10:
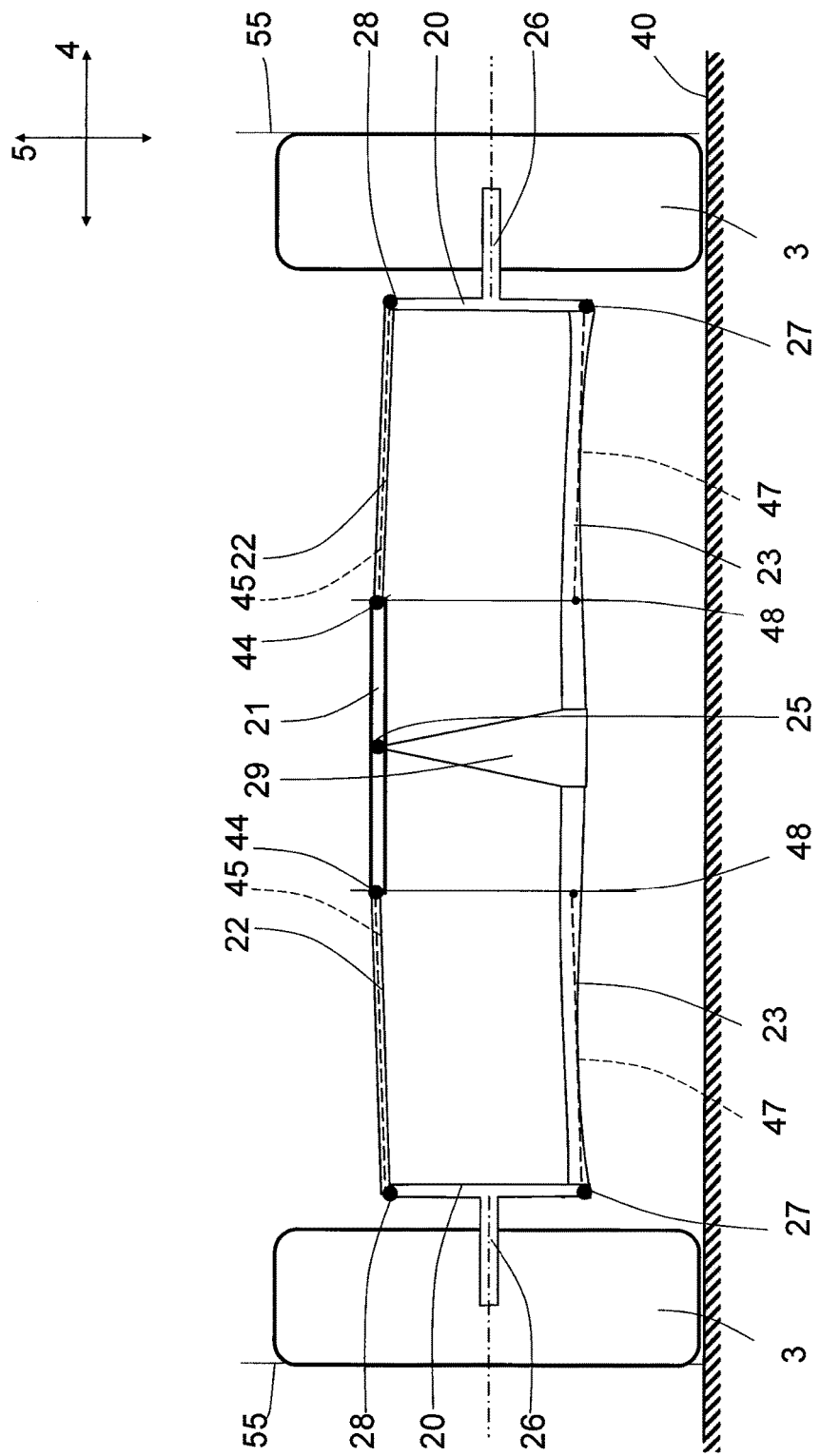
FIG. 10 shows an example embodiment of a wheel suspension arrangement having the leaf spring at the bottom.

FIG. 10 show an alternative example embodiment where the leaf spring 22 is located on the lower side of the wheel suspension arrangement and the control arms 23 on the upper side. Consequently, the first vertical end region of the wheel holder corresponds to the upper vertical end region of the wheel holder, and the second vertical end region of the wheel holder corresponds to the lower vertical end region of the wheel holder. This layout of the wheel suspension arrangement is advantageous in terms of reduced level of vehicle roll. This is realised because the vehicle roll centre, which corresponds to the pivotal attachment location 25 during vehicle roll, is located closed to the centre of mass of the vehicle. A reduced distance between the roll centre and mass centre automatically results in reduced roll torque acting the vehicle support structure.

Figure 11:
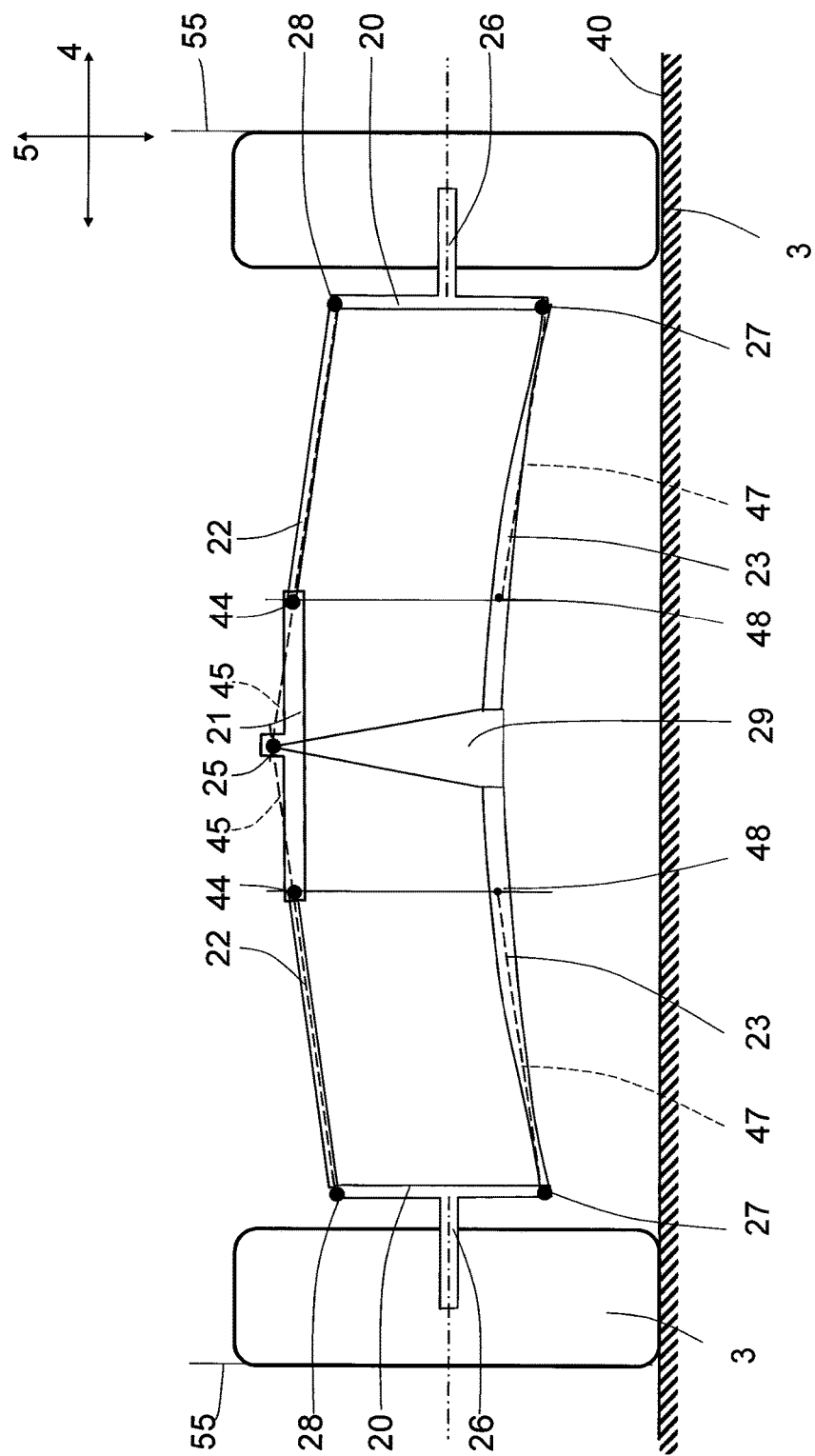
FIG. 11 shows an example embodiment of a wheel suspension arrangement having a inclined natural state of the rigid control arms.

FIG. 11 schematically illustrates an example embodiment similar to FIG. 10 but with the difference that the rigid control arms 22 is inclined in the natural state of the wheel suspension arrangement. Similar to above, the Ross line 47 of the leaf spring 23 is inclined with essentially the same angle as the rigid control arms 22, such that the Ross lines 47 are parallel with the longitudinal extension of the of the rigid control arms 22. For the purpose of obtaining good camber error compensation during vehicle body roll the pivotal attachment location 25 is located such as to substantially coincide with the straight line 45 extending between an inner and outer pivotal attachment location 44, 28 of the rigid control arm as viewed from the front of the vehicle.

Figure 12:
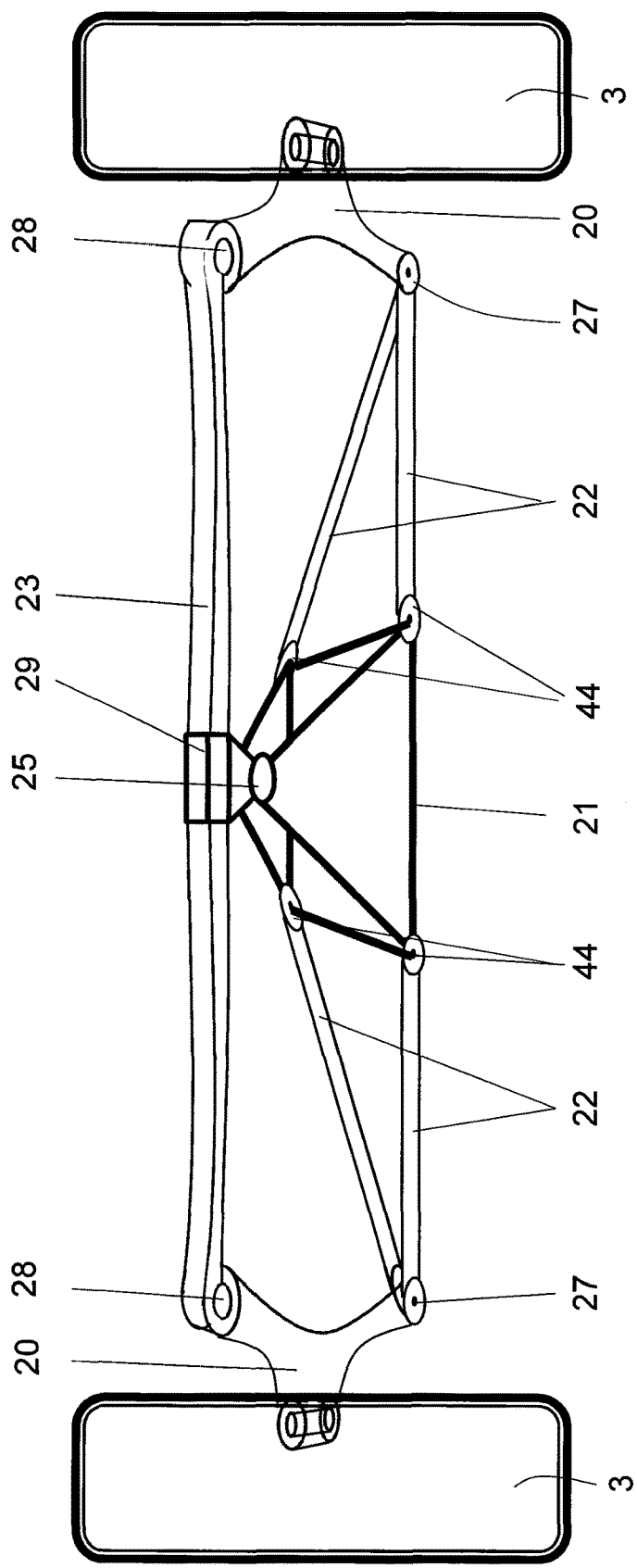
FIG. 12 shows a perspective view of an example embodiment of a wheel suspension arrangement.

FIG. 12 schematically illustrates an perspective view of the wheel suspension arrangement comprising a vehicle support structure 21, rigid control arms 22 pivotally connecting the wheel holders 20 to the vehicle support structure 21 at inner and outer pivotal attachment locations 44, 27, a leaf spring 23 extending from one wheel holder 20 to the wheel holder 20 on the opposite side in the transverse direction, as well as a pivotal attachment of the leaf spring 23 to the vehicle support structure 21 by means of the spring holder 29 that is pivotally mounted at the pivotal attachment location 25. Each of the rigid control arms 21 comprises two pivotal attachment locations 44 to the vehicle support structure 21 and one pivotal attachment location to the wheel holder 20. The leaf spring comprises a single pivotal attachment 28 to each wheel holder 20.

It is to be understood that the present invention is not limited to the embodiments described above and illustrated in the drawings; rather, the skilled person will recognize that many changes and modifications may be made within the scope of the appended claims. For example, a steering linkage may be provided for steering the wheels of the wheel suspension arrangement. The wheel suspension arrangement may be used for the front wheels, rear wheels or trailer wheel, steered wheels, non-steered wheel, driven wheels or non-driven wheels.

The invention claimed is:

1. A wheel suspension arrangement for a vehicle having a longitudinal direction, a transverse direction and a vertical direction, the wheel suspension arrangement comprising a wheel holder for supporting a vehicle wheel, wherein a first vertical end region of the wheel holder is pivotally attached to a vehicle support structure by means of a rigid control arm, wherein a second vertical end region of the wheel holder is attached to the vehicle support structure by means of a leaf spring, wherein a longitudinal direction of the leaf spring is arranged substantially in the transverse direction of the vehicle, wherein the leaf spring is pivotally attached to the vehicle support structure at a transverse center region of the vehicle, and wherein a center of the leaf spring in the transverse direction is located vertically offset from a pivotal attachment location of the leaf spring, wherein the pivotal attachment location of the leaf spring is vertically offset towards the side of the rigid control arm, wherein each transverse end region of the leaf spring is connected to an individual wheel holder, and wherein a first vertical distance between the pivotal attachment location and a control arm extension at a transverse center of the vehicle is less than 50% of a second vertical distance between the leaf spring and the control arm extension at the transverse center of the vehicle.

2. The wheel suspension arrangement according to claim 1, wherein the leaf spring is pivotally attached to the vehicle support structure by means of a spring holder which is rigidly connected to the leaf spring, the spring holder is pivotally attached to the vehicle support structure around a substantially horizontal axis at the transverse center region of the vehicle, and the leaf spring is located vertically offset from a pivotal attachment location of the spring holder.

3. The wheel suspension arrangement according to claim 2, wherein the spring holder is rigidly connected to the leaf spring at a single central location.

4. The wheel suspension arrangement according to claim 2, wherein the spring holder at least partly surrounds a portion of the leaf spring for establishing the rigid connection.

5. The wheel suspension arrangement according to claim 2, wherein the spring holder clamps the leaf spring over a portion extending at least 50 millimeters in the transverse direction for establishing the rigid connection.

6. The wheel suspension arrangement according to claim 2, wherein the spring holder clamps the leaf spring over a transverse portion, and a ratio between a transverse clamping portion of the spring holder to the distance between the leaf spring to the pivotal attachment location is in the range of 1:0.5-1:5.

7. The wheel suspension arrangement according to claim 1, wherein the first vertical distance is less than 25% of the second vertical distance.

8. The wheel suspension arrangement according to claim 1, wherein the wheel suspension arrangement further comprises body roll damper unit and/or a body roll spring unit mounted such that pivotal motion of the leaf spring around the pivotal attachment location is affected by the body roll damper unit and/or the body roll spring unit.

9. The wheel suspension arrangement according to claim 8, wherein the body roll damper unit and/or a body roll spring unit is connected to the vehicle support structure and to at least one of the leaf spring, the spring holder or another member that is directly or indirectly rigidly connected to the leaf spring or spring holder.

10. The wheel suspension arrangement according to claim 8, wherein the body roll damper unit is a rotational damper.

11. The wheel suspension arrangement according to claim 1, wherein the first vertical end region of the wheel holder corresponds to an upper vertical end region of the wheel holder, and the second vertical end region of the wheel holder corresponds to a lower vertical end region of the wheel holder.

12. The wheel suspension arrangement according to claim 1, wherein the first vertical end region of the wheel holder corresponds to a lower vertical end region of the wheel holder, and the second vertical end region of the wheel holder corresponds to an upper vertical end region of the wheel holder.

13. The wheel suspension arrangement according to claim 1, wherein an outer pivotal attachment location of the rigid control arm to the wheel holder is located in the same longitudinally extending vertical plane as an attachment location of the leaf spring to the wheel holder.

14. The wheel suspension arrangement according to claim 1, wherein the rigid control arm comprises at least two longitudinally spaced apart pivotal connections to the vehicle support structure.

15. The wheel suspension arrangement according to claim 1, wherein the rigid control arm is manufactured to form a single entity.

16. The wheel suspension arrangement according to claim 1, wherein the second vertical end region of the wheel holder is attached to the vehicle support structure only by means of the leaf spring.

17. The wheel suspension arrangement according to claim 1, wherein the wheel suspension arrangement further comprises a body suspension damper unit and/or a body suspension spring unit mounted such that vertical motion of the wheel holder is affected by the body suspension damper unit and/or the body suspension spring unit.

18. The wheel suspension arrangement according to claim 17, wherein the body suspension damper unit and/or a body suspension spring unit is mounted, directly or indirectly, between the vehicle support structure and one of the rigid control arm; the wheel holder; or leaf spring.

19. The wheel suspension arrangement according to claim 1, wherein the wheel holder forms a king post provided with a wheel spindle holder for a steerable wheel.

20. The wheel suspension arrangement according to claim 1, wherein the wheel holder is provided with a wheel hub for a, driven or non-driven, non-steerable wheel.

21. A vehicle comprising a wheel suspension arrangement according to claim 1.

* * * * *